United States Patent Office 3,531,428
Patented Sept. 29, 1970

3,531,428
PROCESS FOR PREPARING POLYMER LATEXES
Jack Dickstein, Ping Kang Shen, and Eugene Alfred Duchesneau, Leominster, Worcester, Mass., assignors to Borden, Inc., New York, N.Y., a corporation of New Jersey
No Drawing. Filed Apr. 26, 1967, Ser. No. 633,691
Int. Cl. C08f 1/13, 15/40, 37/00
U.S. Cl. 260—29.6                                       8 Claims

ABSTRACT OF THE DISCLOSURE

This invention relates to a process for preparing mechanical and freeze-thaw stable polyvinyl chloride polymer latexes. More particularly, this invention relates to a process for preparing a polymer latex wherein a monomeric vinyl halide, an alpha-unsaturated carboxylic acid and, an ester of an alpha-methylene aliphatic monocarboxylic acid are copolymerized. The ester is continuously added to the reaction vessel during up to about the first 30–80% of the total reaction time. The reaction thereafter continues and unreacted monomeric vinyl halide is thereafter stripped from the reaction mass.

BACKGROUND OF THE INVENTION

Polyvinyl halide latexes are often compounded with other materials for use in coating compositions, and with pigments, plasticizers and surfactants as well as in other fields and with other components. When these latexes are being compounded with other materials, they must often be mixed with such other materials at high speeds in order to affect a homogeneous composition. During this mixing, the polyvinyl latexes generally exhibit poor mechanical stability so that the viscosity of the latex unduly increases and leads to curdling or coagulation of the copolymer latex composition. When this occurs, the composition is useless and must be discarded because the viscosity of the vinyl compounded material is unsuitable.

Additionally, these materials, when compounded, exhibit poor shelf life.

It was also found that when copolymer latex compositions were shipped, they were often subjected to repeated freezing and thawing as a result of the surrounding atmospheric conditions. Upon freezing and thawing, the copolymer latex emulsions tended to coagulate or separate so that they were thereby rendered useless. This problem was also present when the materials were stored in a non-heated building. Thus, in order to combat the deleterious effects of the freeze-thaw cycles, the copolymer latexes had to be shipped either in a vehicle whose shipping space was heated, or/and stored in a heated building. This added to the final cost of the product due to the cost of maintaining heated shipping areas and heated storage facilities.

It is therefore an object of this invention to provide a process for preparing a polyvinyl halide latex composition which exhibits enhanced mechanical stability.

Another object of this invention is to provide a process for preparing a polyvinyl halide latex composition which exhibits freeze-thaw stability. A further object of this invention is to provide a polyvinyl halide latex composition which when compounded with other components, will have an enhanced shelf life.

Other objects and advantages will become apparent from the following more complete description and claims.

SUMMARY OF THE DISCLOSURE

Broadly, this invention contemplates a process for producing a polyvinyl halide latex composition having improved mechanical and freeze-thaw stability comprising adding a monomeric vinyl halide, water and an alpha-unsaturated carboxylic acid to a reaction vessel, adding an ester of an alpha-methylene aliphatic monocarboxylic acid to said vessel, reacting said halide, said acid and said ester, said ester being continuously added during the reaction at a rate sufficient so that from about 68 to about 82% of said ester is added continuously preferably during about up to from the first 30 to 65% of the total reaction time, and completing said reaction whereby a polyvinyl halide latex emulsion is produced having enhanced mechanical and freeze-thaw stability.

DETAILED DESCRIPTION

In practicing the process of this invention, water is added to a reaction vessel and heated to a temperature sufficient to affect a solution with a catalyst which is next added. The solution is accomplished with agitation. To this solution is then added an alpha-unsaturated carboxylic acid. The reaction vessel is then closed and vinyl halide monomer and an ester of an alpha-methylene aliphatic monocarboxylic acid is added through a system of pipes. The reaction mass is heated to the desired temperature and is maintained at this temperature during the continuing addition of the ester and vinyl halide monomers. After the addition of the vinyl halide monomer has been completed and when the jacket temperature of the mantle surrounding the reaction vessel begins to rise, heat is supplied to the reaction mass. The residual monomers are then stripped from the resultant polymer latex and the pH of the latex is adjusted to that desired.

When the ester of an alpha-methylene aliphatic monocarboxylic acid is added to the reaction, from about 68% to about 82% of the total amount of the ester to be added must be added continuously preferably during about from the first 30% to about 65% of the total reaction time although from 30 to 80% can also be sucessfully utilized.

If the ester is added in any other manner, then the resultant polymer latex will not exhibit enhanced mechanical and freeze-thaw stability.

The rate of addition of the ester and the monomeric vinyl halide is preferably such that a ratio of about 1.5 of ester to 1.0 of monomeric vinyl halide is maintained during the addition of the vinyl halide.

The ester is utilized in an amount of from about 3 to about 19 parts by weight for about 100 parts by weight of the total monomer content. However, it is preferred to use an ester in an amount of from about 7 to about 11 parts by weight as excellent results have thereby been obtained.

It is preferred that the alpha-methylene aliphatic monocarboxylic acid ester have no more than about 12 carbon atoms.

Among the esters which are used are acrylates such as ethyl acrylate, methyl acrylate, propyl acrylate, butyl acrylate, octyl acrylate, decyl acrylate, 2-ethylhexyl acrylate and the like.

The reaction itself is conducted at temperatures of from about 100° F. to about 150° F. at from about 80 to about 100 p.s.i.g. and for periods of time from about 12 to about 35 hours. The time of the reaction will vary somewhat, depending upon the reaction temperature and pressure used. However, it is preferred to conduct the process at temperatures of between about 120° and 130° F. for about 18 to 24 hours. The pressure at which the reaction is conducted will also vary somewhat. Generally, the higher the temperature at which the reaction is conducted, the greater will be the pressure.

A catalyst is used in an amount of from about 0.08 to about 0.3 part for 100 parts by weight of the total monomer composition. It is preferred, however, that a catalyst be used in an amount of from about 0.16 to about 0.2 part.

Among the catalysts which may be used are potassium persulfate, ammonium persulfate, water soluble catalysts such as urea peroxide, peracetic acid, succinic acid peroxide, and the ilke.

The vinyl monomer is added to the reaction vessel continuously during most of the reaction and at the same time as is the ester. Generally, the vinyl monomer is added in an amount of from about 80 to about 96 parts of vinyl monomer and preferably 87 to 90 parts by weight based on 100 parts by weight of the total monomers added.

The alpha-unsaturated carboxylic acid is added initially to the reaction vessel before it is closed and before the vinyl halide monomer addition is begun. Generally, the acid is used in an amount of from about 0.1 part to about 2.0 parts of acid for 100 parts by weight of the total monomers added. It is preferred, however, to use an acid in an amount of from about 0.4 to about 0.6 part. When using the acid, the acid may be used as a 50% solution of acid in water or other compatible solvent. The parts given for the acid have been calculated on the basis of 100 percent acid.

Among the acids which may be used are acrylic acid, fumaric acid, maleic anhydride or acid, and the like.

After the reaction is completed, residual monomers are then stripped off in any suitable manner and the pH of the latex is then adjusted to between about 8.5 and 10.5, using any suitable base, such as ammonium hydroxide.

If desired, a buffer may be used during the reaction to keep the pH from falling below 2. If the pH falls below 2, then there is the possibility that the reaction mass may coagulate and the desired latex will not be obtained.

Among the materials which may be used to control the pH during the reaction itself, are ammonium hydroxide, sodium hydroxide, potassium hydroxide, sodium phosphate, and potassium phosphate, and the like.

The buffer is generally used in an amount of from about 0.2 to about 1 part by weight and preferably about 0.5 part based on 100 parts of the weight of the total monomer composition.

A surfactant is often employed, both before the reaction vessel is closed and during the reaction, to prevent the forming vinyl halide polymer latex from coagulating. The surfactant may initially be employed (before the reaction vessel is closed) in an amount of from about 0.002 part to about 0.5 part by weight based on 100 parts of the monomer composition. When a surfactant is added after the reaction vessel has been closed and during the reaction itself, it is added during most of the reaction cycle and in a total amount of from about 1.75 to about 9 parts by weight and preferably from about 4.3 to about 4.9 parts by weight.

Among the surfactants which may be used are sodium lauryl sulfate, sodium alkyl aryl sulfonates such as sodium dodecyl benzene sulfonate etc., a mixture comprising alkyl aryl sulfonate with other surfactants such as tetra-sodium N-(1,2-dicarboxyethyl)N-octadecyl sulfosuccinamate, and the like. A mixture of surfactants is preferred.

In the process of this invention, a seed latex is often used to control the particle size of the final polyvinyl halide latex emulsion. The seed latex may be composed of an emulsion of polyvinyl chloride containing 30% solids with a particle size of 0.03 to 0.1 micron, and is used in an amount of from about 2 to about 4 parts for 100 parts of the total monomer compositon and preferably from about 2.3 to about 2.9 parts by weight. The seed latex is added to the reaction vessel before it is closed and before the vinyl halide monomer is added thereto.

It is often desirable to incorporate a chain regulator in the reaction process. If a chain regulator is to be present, it is preferably added before the monomeric vinyl halide is added. The chain regulator is used in an amount of from about 0.05 to about 1.0 part and preferably from about 0.4 to about 0.6 part for 100 parts of the total monomer composition. Among the chain regulators which are used are trichloroethylene, and the like.

In order to more fully illustrate the nature of this invention and the manner of practicing the same, the following examples are presented.

Example I

The following components were charged to a Pfaudler glass-lined reactor having an agitator with a speed of 60 r.p.m.

| Components: | Parts based on 100 parts of total monomers |
|---|---|
| (1) Deionized water | 59.0798 |
| (2) Diammonium phosphate | 0.5500 |
| (3) Sodium dodecyl benzene sulfonate | 0.0035 |
| (4) Polyvinyl chloride emulsion containing 30% solids and a particle size of 0.03 to 0.1 microns (seed latex) | 2.6700 |
| (5) Potassium persulfate | 0.1800 |
| (6) Trichloroethylene | 0.5000 |
| (7) 50% aqueous acrylic acid solution | 1.9803 |

The water is placed in the reactor and brought to a temperature of 110° F. with agitation. The phosphate, persulfate, and sodium dodecyl benzene sulfonate are added with agitation until a solution results (about 10 minutes). The seed latex and acrylic acid solution are then added. The reactor is closed and evacuated to maximum vacuum. The trichloroethylene is then sucked into the reactor. The vacuum within the reactor is then broken with vinyl chloride monomer vapors. The reactants, while being agitated, are then heated to 125° F.

89.1089 parts of vinyl chloride monomer are added to the reaction mass at an hourly rate of 4.17%.

Simultaneously therewith, ethyl acrylate is added at an hourly rate of 6.25%, which rate continues for the first 12 hours of the reaction. The total amount of ethyl acrylate added for the first 12 hours is 75% of the total amount of acrylate to be added during the reaction period. After the first 12 hours of the reaction, the hourly ethyl acrylate addition rate is diminished to 2.08% of the total acrylate to be present. The total amount of acrylate to be added is 9.9010 parts.

Simultaneous with the addition of the vinyl chloride monomer and the ethyl acrylate monomer, sodium dodecyl benzene sulfonate and tetrasodium N-(1,2-dicarboxyethyl)-N-octadecyl sulfosuccinamate is added at an hourly rate of 4.76% of the total surfactant solution to be added, which in this case is 1.25 parts and 2.5 parts respectively.

After the additions are completed, the temperature of the jacket of the reaction vessel begins to rise. The batch temperature is thereafter increased to 160° F. and held there for two hours to drive the reaction to completion Thereafter, the batch temperature is cooled to 120° F. and any residual unreacted monomers are then removed. After removal of the monomers, the reaction mass is cooled to 90° F. The pH of the reaction is then adjusted to 9.0, using 26% ammonium hydroxide. Thereafter, the latex emulsion is screened through a 125 mesh screen to remove any grits which may have formed.

The resultant latex emulsion exhibited excellent freeze/thaw and mechanical stability, as well as excellent pigment stability.

Example II

The procedure of Example I is repeated several times, except that the amount of ethyl acrylate present was varied each time. The amount of ethyl acrylate used is 3 parts and 19 parts. An excellent product having good mechanical and freeze-thaw stability is obtained.

Example III

The procedure of Example I is repeated, except that in one instance 68% of the total amount of acrylate to be present was added over the first 60–80% of the reaction time and in the second instance 82% of the amount of ethyl acrylate to be added is added over the first 30–65% of the reaction time. In each instance, a good product is obtained.

Example IV

The procedure of Example I is repeated several times. In each instance, the acrylate used is varied. The acrylates used are methyl acrylate, butyl acrylate, decyl acrylate, 2-ethylhexylacrylate. In each instance, an excellent product is obtained.

Example V

The procedure of Example I is repeated, except that the amount of acrylic acid used is varied. In one preparation, 0.1 part of acrylic acid is used. In another preparation, 2 parts of acrylic acid is used.

Example VI

The procedure of Example I is repeated, except that the acid used is varied. The acid used in several preparations is as follows: fumaric acid and maleic acid. In each instance, an excellent product is obtained.

Example VII

The process of Example I is repeated several times. The process is varied each time so that:

(a) acrylate monomer is added at a constant addition rate of 4.12% during the entire reaction.
(b) 85% of the acrylate monomer is added over the first 50% of the total reaction time.
(c) 65% of the total amount of the acrylate to be present is added over the first 50% of the total reaction time.
(d) The acrylic acid is dissolved in the ethyl acrylate and added to the reaction in the same manner as the acrylate is added in Example I.

The mechanical stability, pigment mechanical stability and freeze/thaw stability of (a), (b) and (c) are compared with the product of Example I. The stability properties of preparation (d) is not compared to the stability properties of Example I because preparation (d) coagulated during the process.

In all instances, only the preparation of Example I exhibited freeze/thaw stability. Additionally, the product of Example I exhibited much greater mechanical stability and pigment mechanical stability than did the products prepared by preparations (a) through (c).

The products prepared by this process are extremely useful. The unusual stability obtained by the process of this invention enables one to ship the latexes prepared by this process without having to resort to shipping and/or storing in heated vehicles or buildings. Additionally, the product exhibits excellent mechanical and pigment stability so that it will not, when being compounded with other materials, or when being pumped from the reactor, coagulate.

Polymer latexes prepared according to this invention may be used in coating fabrics, preparing paints, and other pigmented products.

As used in the specification and claims and unless specified otherwise, all parts are parts by weight based on 100 parts of the total monomers added.

While this invention has been described in terms of certain preferred embodiments and illustrated by means of specific examples, the invention is not to be construed as limited except as set forth in the following claims.

We claim:

1. A process for producing a polyvinyl halide latex composition having improved mechanical and freeze thaw stability which comprises adding water and about 0.1 to about 2 parts by weight of an alpha-unsaturated carboxylic acid to a reaction vessel; then adding about 80 to 96 parts by weight of vinyl halide monomer and from about 3 to 19 parts by weight of an ester of an alpha-methylene aliphatic monocarboxylic acid to said vessel, reacting said halide, said acid, and said ester, said ester and said halide beng continuously added during the reaction, said ester being added at a sufficient rate so that from about 68% to about 82% of the total ester to be added is added during about the first 30% to 65% of the total reaction time, and completing said reaction whereby a polyvinyl halide latex emulsion is produced having enhanced mechanical and freeze-thaw stability.

2. A process according to claim 1, wherein said vinyl halide is vinyl chloride.

3. A process according to claim 1, wherein said acid is acrylic acid.

4. A process according to claim 1, wherein said ester is ethyl acrylate.

5. A process according to claim 1, wherein said ester is an acrylate ester having up to about 10 carbon atoms.

6. A process according to claim 1, wherein 75% of said ester is continually added during the first one-half of the total reaction time.

7. A process for producing a polyvinyl chloride latex composition having improved mechanical and freeze-thaw stability which comprises adding water and about 0.1 to about 2 parts by weight of acrylic acid to a reaction vessel; then adding about 3 to about 19 parts by weight of ethyl acrylate and about 80 to 96 parts by weight of monomeric vinyl chloride to said vessel; heating the reactants at a temperature of from about 0° F. to about 150° F. and a pressure of up to about 100 p.s.i.g., thereby reacting said monomeric vinyl chloride, said acrylic acid and said ethyl acrylate, said ethyl acrylate and vinyl chloride being continuously added during said reaction at a rate sufficent so that from about 68% to 82% of said ethyl acrylate is added continuously during the first 30 to 65% of the total reaction time and completing said reaction whereby a polyvinyl chloride latex emulsion is produced having enhanced mechanical and freeze-thaw stability.

8. The product prepared by adding to a reaction vessel, water and from about 0.1 to 2 parts by weight of an alpha-unsaturated carboxylic acid; then adding from about 3 to 19 parts by weight of an ester of an alpha-methylene aliphatic monocarboxylic acid and from about 80 to 96 parts by weight of monomeric vinyl halide, said ester and said vinyl chloride being continuously added during the reaction at a sufficient rate so that from about 68% to about 82% of said ester is added continuously during the first 30% to 65% of the total reaction time, reacting said halide, said acid and said vinyl ester, and completing said reaction whereby a polyvinyl halide latex emulsion is produced having enhanced mechanical freeze-thaw stability.

References Cited

UNITED STATES PATENTS

| 2,689,242 | 9/1954 | Lucht | 260—86.3 |
| 2,868,748 | 1/1959 | Frazier et al. | 260—86.3 |
| 3,370,031 | 2/1968 | Grommers et al. | |

MURRAY TILLMAN, Primary Examiner

W. J. BRIGGS, Jr., Assistant Examiner

U.S. Cl. X.R.

117—161; 260—41, 80.8, 80.81